(12) United States Patent
Viswanathan

(10) Patent No.: US 8,647,512 B2
(45) Date of Patent: Feb. 11, 2014

(54) USE OF MAGNETIC CARBON COMPOSITES FROM RENEWABLE RESOURCE MATERIALS FOR OIL SPILL CLEAN UP AND RECOVERY

(75) Inventor: Tito Viswanathan, Little Rock, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 371 days.

(21) Appl. No.: 12/751,185

(22) Filed: Mar. 31, 2010

(65) Prior Publication Data

US 2010/0307983 A1  Dec. 9, 2010

Related U.S. Application Data

(63) Continuation-in-part of application No. 12/487,323, filed on Jun. 18, 2009.

(60) Provisional application No. 61/132,380, filed on Jun. 18, 2008, provisional application No. 61/211,826, filed on Apr. 3, 2009.

(51) Int. Cl.
*E02B 15/04* (2006.01)
*C02F 1/48* (2006.01)
*C01B 31/08* (2006.01)

(52) U.S. Cl.
USPC ........... 210/680; 210/691; 210/694; 210/695; 210/924; 502/406; 502/423; 502/437

(58) Field of Classification Search
USPC .......... 210/680, 691, 694, 695, 924; 502/406, 502/423, 437
See application file for complete search history.

(56) References Cited

U.S. PATENT DOCUMENTS 3,803,033 A * 4/1974 Sutherland .................... 210/673
3,886,093 A  5/1975 Dimitri
(Continued)

FOREIGN PATENT DOCUMENTS

CN  1876566 A  12/2006

OTHER PUBLICATIONS

Antal et al., Flash carbonization of biomass, Industrial & Engineering Chemistry Research, 2003, 42(16), 3690-3699.

(Continued)

*Primary Examiner* — David A Reifsnyder
(74) *Attorney, Agent, or Firm* — Morris, Manning & Martin, LLP; Tim Tingkang Xia, Esq.

(57) ABSTRACT

A method for separating a liquid hydrocarbon material from a body of water. In one embodiment, the method includes the steps of mixing a plurality of magnetic carbon-metal nanocomposites with a liquid hydrocarbon material dispersed in a body of water to allow the plurality of magnetic carbon-metal nanocomposites each to be adhered by an amount of the liquid hydrocarbon material to form a mixture, applying a magnetic force to the mixture to attract the plurality of magnetic carbon-metal nanocomposites each adhered by an amount of the liquid hydrocarbon material, and removing said plurality of magnetic carbon-metal nanocomposites each adhered by an amount of the liquid hydrocarbon material from said body of water while maintaining the applied magnetic force, wherein the plurality of magnetic carbon-metal nanocomposites is formed by subjecting one or more metal lignosulfonates or metal salts to microwave radiation, in presence of lignin/derivatives either in presence of alkali or a microwave absorbing material.

21 Claims, 4 Drawing Sheets

(56) References Cited

U.S. PATENT DOCUMENTS

| | | |
|---|---|---|
| 4,019,995 A | 4/1977 | Briggs |
| 4,108,767 A | 8/1978 | Cooper |
| 4,457,853 A | 7/1984 | Detroit |
| 4,985,225 A | 1/1991 | Hashimoto et al. |
| 5,604,037 A | 2/1997 | Ting |
| 5,972,537 A | 10/1999 | Mao |
| 6,099,990 A | 8/2000 | Denton |
| 6,232,264 B1 | 5/2001 | Lukehart |
| 6,486,008 B1 | 11/2002 | Lee |
| 6,733,827 B2 * | 5/2004 | Mitchell et al. ............... 427/228 |
| 6,764,617 B1 | 7/2004 | Viswanathan |
| 7,220,484 B2 | 5/2007 | Ton-That |
| 7,297,652 B2 | 11/2007 | Jhung |
| 7,303,679 B2 | 12/2007 | Ulicny et al. |
| 7,358,325 B2 | 4/2008 | Hayes |
| 7,758,756 B2 | 7/2010 | Kim |
| 2002/0064495 A1 * | 5/2002 | Miura et al. ............... 423/445 R |
| 2004/0147397 A1 * | 7/2004 | Miller et al. ................. 502/406 |
| 2005/0139550 A1 | 6/2005 | Ulicny et al. |
| 2005/0181941 A1 | 8/2005 | Sugo et al. |
| 2005/0186344 A1 | 8/2005 | Takagi |
| 2005/0271816 A1 | 12/2005 | Meschke |
| 2007/0129233 A1 | 6/2007 | Ueno et al. |
| 2007/0142225 A1 | 6/2007 | Baker |
| 2007/0218564 A1 | 9/2007 | Bachmann et al. |
| 2007/0243337 A1 | 10/2007 | Xiong et al. |
| 2007/0264574 A1 | 11/2007 | Kim |
| 2007/0266825 A1 | 11/2007 | Ripley |
| 2008/0017291 A1 | 1/2008 | Shin et al. |
| 2008/0160306 A1 | 7/2008 | Mushtaq et al. |
| 2010/0200501 A1 | 8/2010 | Hoag |
| 2010/0283005 A1 | 11/2010 | Pickett et al. |

OTHER PUBLICATIONS

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous Fe3O4/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourgeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni-P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

Sheng, Changdong, Char Structure Characterised by Raman Spectroscopy and Its Correlations with Combustion Reactivity, ScienceDirect, 2007, 2316-2324.

\* cited by examiner

USE OF MAGNETIC CARBON COMPOSITES FROM RENEWABLE RESOURCE MATERIALS FOR OIL SPILL CLEAN UP AND RECOVERY

CROSS-REFERENCE TO RELATED PATENT APPLICATION

This application is a continuation-in-part of U.S. patent application Ser. No. 12/487,323, filed on Jun. 18, 2009, still pending entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME" by Tito Viswanathan, which is incorporated herein by reference in its entirety and itself claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety. This application also claims the benefit, pursuant to 35 U.S.C. 119(e), of U.S. provisional patent application Ser. No. 61/211,826 filed Apr. 3, 2009, entitled "USE OF MAGNETIC CARBON COMPOSITES FROM RENEWABLE RESOURCE MATERIALS FOR OIL SPILL CLEAN UP," by Tito Viswanathan.

STATEMENT OF FEDERALLY-SPONSORED RESEARCH

The present invention was made with Government support under Grant No. DEFC 36-06G086072 awarded by U.S. Department of Energy (DOE). The government has certain rights in the invention.

This application relates to U.S. Pat. No. 8,167,973, filed Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to the field of separating mixtures of water and oil, and oil spill clean up and recovery, in particular, to separating mixtures of water and oil, and oil spill clean up and recovery using magnetic carbon composites from renewable resource materials, and applications of same.

BACKGROUND

Using magnetic materials that can attract oil in the clean up of petroleum spills is not new. It is understood that U.S. Pat. No. 7,303,679 discloses a method of recovering spilled hydrocarbon fluids from a body of water utilizing the increased oleophilic properties of reacted iron particles suspended in a magnetorheological (MR) fluid. The iron particles normally used to create MR fluids, are reacted with an organic compound containing an oleophilic chain end which attaches to the surface of the iron, prior to suspension in a liquid vehicle such as an organic oil. The reacted iron particles in the MR fluid are then applied to and mixed with a hydrocarbon spill on a body of water such as an oil spill in water, whereby subsequent exposure to a significant magnetic field provides for subsequent recovery of both the reacted magnetic particles and the hydrocarbon spill. Other methods may also exist. However, such a synthetic procedure may be considered as tedious, expensive, and time consuming. Moreover, use of organic solvents may not be considered environmentally friendly. Thus, currently there is not an affordable yet efficient product available for oil spill clean up and recovery.

Therefore, a heretofore unaddressed need exists in the art to address the aforementioned deficiencies and inadequacies.

SUMMARY OF THE INVENTION

In one aspect, the present invention provides a method for separating a liquid hydrocarbon material from a body of water. In one embodiment, the method includes the steps of:

mixing a plurality of magnetic carbon-metal nanocomposites with a liquid hydrocarbon material dispersed in a body of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material; and removing said plurality of magnetic carbon-metal nanocomposites each adhered by an amount of the liquid hydrocarbon material from said body of water while maintaining the applied magnetic force, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

In one embodiment, the microwave radiation has a frequency in the range of 900 MHz to 5.8 GHz.

In one embodiment, the microwave absorbing material comprises graphite, carbon black, or a combination of them.

The one or more metal lignosulfonates or metal salts each are magnetic in their elemental form or in their oxide form. In one embodiment, the one or more metal lignosulfonates or metal salts comprise iron, iron oxides, cobalt, cobalt oxides, nickel, nickel oxides, or a combination of them.

In another aspect, the present invention provides a method for separating a liquid hydrocarbon material dispersed in a volume of water. In one embodiment, the method includes the steps of:

mixing a plurality of magnetic carbon-metal nanocomposites with a liquid hydrocarbon material dispersed in a volume of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material;

removing said plurality of magnetic carbon-metal nanocomposites each adhered by an amount of the liquid hydrocarbon material from said volume of water while maintaining the applied magnetic force;

removing the magnetic force; and separating the liquid hydrocarbon material from the said plurality of magnetic carbon-metal nanocomposites, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

In yet another aspect, the present invention provides a method for separating a liquid hydrocarbon material from a body of water. In one embodiment, the method includes the steps of:

mixing a plurality of magnetic carbon-metal nanocomposites with a liquid hydrocarbon material dispersed in a body of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material; and removing said body of water from said plurality of magnetic carbon-metal nanocomposites each adhered by an amount of the liquid hydrocarbon material while maintaining the applied magnetic force, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

These and other aspects of the present invention will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The drawings described below are for illustration purposes only. The drawings are not intended to limit the scope of the present teachings in any way. The patent or application file may contain at least one drawing executed in color. If so, copies of this patent or patent application publication with color drawing(s) will be provided by the Office upon request and payment of the necessary fee.

DETAILED DESCRIPTION

Figure 1:
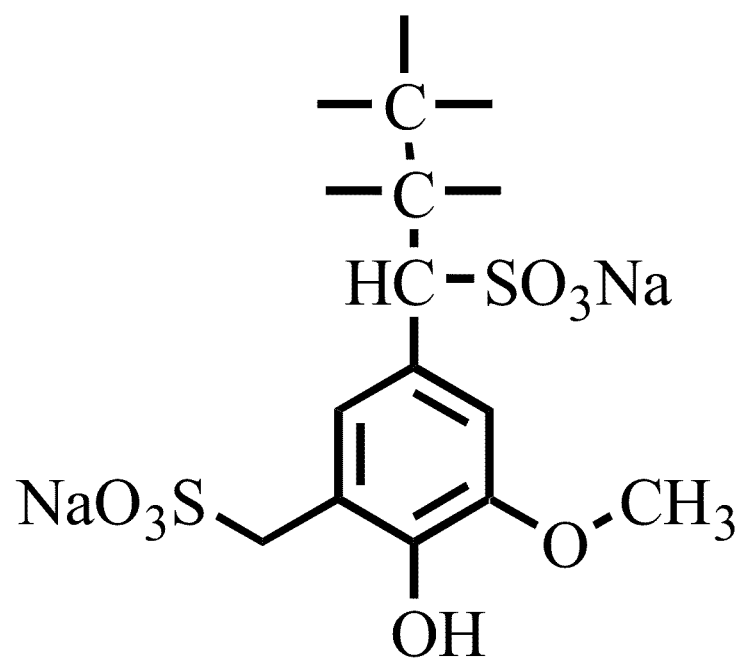
FIG. 1 shows a typical sulfonated/sulfomethylated lignin monomer unit related to various embodiments of the present invention.

The present invention is more particularly described in the following examples that are intended as illustrative only since numerous modifications and variations therein will be apparent to those skilled in the art. Various embodiments of the invention are now described in detail. Referring to the drawings, FIGS. 1-4, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction (XRD)" refers to one of X-ray scattering techniques that are a family of non-destructive analytical techniques which reveal information about the crystallographic structure, chemical composition, and physical properties of materials and thin films. These techniques are based on observing the scattered intensity of an X-ray beam hitting a sample as a function of incident and scattered angle, polarization, and wavelength or energy. In particular, X-ray diffraction finds the geometry or shape of a molecule, compound, or material using X-rays. X-ray diffraction techniques are based on the elastic scattering of X-rays from structures that have long range order. The most comprehensive description of scattering from crystals is given by the dynamical theory of diffraction.

As used herein, the term "Raman spectroscopy" or "Raman technique" refers to an optical technique that probes the specific molecular content of a sample by collecting in-elastically scattered light. As photons propagate through a medium, they undergo both absorptive and scattering events. In absorption, the energy of the photons is completely transferred to the material, allowing either heat transfer (internal conversion) or re-emission phenomena such as fluorescence and phosphorescence to occur. Scattering, however, is normally an in-elastic process, in which the incident photons retain their energy. In Raman scattering, the photons either donate or acquire energy from the medium, on a molecular level. In contrast to fluorescence, where the energy transfers are on the order of the electronic bandgaps, the energy transfers associated with Raman scattering are on the order of the vibrational modes of the molecule. These vibrational modes are molecularly specific, giving every molecule a unique Raman spectral signature.

Raman scattering is a very weak phenomena, and therefore practical measurement of Raman spectra of a medium requires high power excitation laser sources and extremely sensitive detection hardware. Even with these components, the Raman spectra from tissue are masked by the relatively intense tissue auto-fluorescence. After detection, post processing techniques are required to subtract the fluorescent background and enable accurate visualization of the Raman spectra. Raman spectra are plotted as a function of frequency shift in units of wavenumber ($cm^{-1}$). The region of the Raman spectra where most biological molecules have Raman peaks is from 500 to 2000 $cm^{-1}$. In contrast to fluorescence spectra, Raman spectra have sharp spectral features that enable easier identification of the constituent sources of spectral peaks in a complex sample.

As used herein, "nanoscopic-scale," "nanoscopic," "nanometer-scale," "nanoscale," "nanocomposites," "nanoparticles," the "nano-" prefix, and the like generally refers to elements or articles having widths or diameters of less than about 1 μm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, "plurality" means two or more.

As used herein, the terms "comprising," "including," "carrying," "having," "containing," "involving," and the like are to be understood to be open-ended, i.e., to mean including but not limited to.

OVERVIEW OF THE INVENTION

The present invention provides, among other things, a method for synthesis, and use of a material derived from renewable resources that is quick, efficient and highly effective in separating oil from water. The oil could be any hydrophobic material that would be attracted to carbon and includes major oil spills such as that resulting from oil tanker disasters and such. The material is made by the microwave treatment of metal lignosulfonates or metal salts in presence lignin/derivatives either in presence of alkali or a microwave absorbing material such as graphite, carbon black etc. The microwave used could be a domestic kitchen microwave and does not require significant investment. The metals used are those that are magnetic in their elemental form or in their oxide form. Examples of such metals include iron, cobalt and nickel.

Thus, in one aspect, the present invention provides a method for separating a liquid hydrocarbon material from a body of water. In one embodiment, the method includes the steps of:

mixing a plurality of magnetic carbon-metal nanocomposites with a liquid hydrocarbon material dispersed in a body of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material; and removing said plurality of magnetic carbon-metal nanocomposites each adhered by an amount of the liquid hydrocarbon material from said body of water while maintaining the applied magnetic force, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

In one embodiment, the microwave radiation has a frequency in the range of 900 MHz to 5.8 GHz.

In one embodiment, the microwave absorbing material comprises graphite, carbon black, or a combination of them.

The one or more metal lignosulfonates or metal salts each are magnetic in their elemental form or in their oxide form. In one embodiment, the one or more metal lignosulfonates or metal salts comprise iron, iron oxides, cobalt, cobalt oxides, nickel, nickel oxides, or a combination of them.

The steps set forth above can be repeated for one or more times with respect to said body of water until the quality of water reaches a desired level. The liquid hydrocarbon material can be recovered from the removed plurality of magnetic carbon-metal nanocomposites each adhered by an amount of the liquid hydrocarbon material after the magnetic force is removed.

In another aspect, the present invention provides a method for separating a liquid hydrocarbon material dispersed in a volume of water. In one embodiment, the method includes the steps of:

mixing a plurality of magnetic carbon-metal nanocomposites with a liquid hydrocarbon material dispersed in a volume of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material;

removing said plurality of magnetic carbon-metal nanocomposites each adhered by an amount of the liquid hydrocarbon material from said volume of water while maintaining the applied magnetic force;

removing the magnetic force; and separating the liquid hydrocarbon material from the said plurality of magnetic carbon-metal nanocomposites, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

In one embodiment, the microwave radiation has a frequency in the range of 900 MHz to 5.8 GHz.

In one embodiment, the microwave absorbing material comprises graphite, carbon black, or a combination of them.

The one or more metal lignosulfonates or metal salts each are magnetic in their elemental form or in their oxide form. In one embodiment, the one or more metal lignosulfonates or metal salts comprise iron, iron oxides, cobalt, cobalt oxides, nickel, nickel oxides, or a combination of them.

In yet another aspect, the present invention provides a method for separating a liquid hydrocarbon material from a body of water. In one embodiment, the method includes the steps of:

mixing a plurality of magnetic carbon-metal nanocomposites with a liquid hydrocarbon material dispersed in a body of water to allow the plurality of magnetic carbon-metal nanocomposites each to be adhered by an amount of the liquid hydrocarbon material to form a mixture;

applying a magnetic force to the mixture to attract the plurality of magnetic carbon-metal nanocomposites each adhered by an amount of the liquid hydrocarbon material; and removing said body of water from said plurality of magnetic carbon-metal nanocomposites each adhered by an amount of the liquid hydrocarbon material while maintaining the applied magnetic force, wherein the plurality of magnetic carbon-metal nanocomposites is formed by subjecting one or more metal lignosulfonates or metal salts to microwave radiation, in presence of lignin/derivatives either in presence of alkali or a microwave absorbing material, for a period of time effective to allow a plurality of carbon-metal nanocomposites to be formed.

In one embodiment, the microwave radiation has a frequency in the range of 900 MHz to 5.8 GHz.

In one embodiment, the microwave absorbing material comprises graphite, carbon black, or a combination of them.

The one or more metal lignosulfonates or metal salts each are magnetic in their elemental form or in their oxide form. In one embodiment, the one or more metal lignosulfonates or metal salts comprise iron, iron oxides, cobalt, cobalt oxides, nickel, nickel oxides, or a combination of them.

In one embodiment, the method further comprises the steps of introducing said body of water to a second container, and repeating the steps set forth immediately above to said body of water.

The steps set forth above can be further repeated for one or more times with respect to said body of water until the quality of water reaches a desired level. The liquid hydrocarbon material can be recovered from the plurality of magnetic carbon-metal nanocomposites each adhered by an amount of the liquid hydrocarbon material after the magnetic force is removed.

Additional details are set forth below.

EXAMPLES

Aspects of the present teachings may be further understood in light of the following examples, which should not be construed as limiting the scope of the present teachings in any way.

Example 1

Lignin and Sources.

Lignin, the major non-cellulosic constituent of wood, is a complex phenolic polymer that bears a superficial resemblance to phenol-formaldehyde resins. It consists of functionalized phenylpropane units connected via alkyl and aryl ether linkages. Essentially, all of the lignin commercially available is isolated as by-products from the paper industry from either the sulfite or the Kraft process.

Sulfonated lignins are obtained either as spent sulfite liquor (SSL) or by sulfonation of lignin obtained from the Kraft process. SSL obtained from the sulfite process consists of lignosulfonates (~55%), sugars (30%), and other ingredients in smaller amounts. FIG. 1 shows a typical monomeric unit of Kraft lignin that has been sulfomethylated at the aromatic ring and sulfonated on the aliphatic side chain. Sulfomethylation is accomplished by the reaction of the Kraft lignin with formaldehyde and sodium sulfite. The aliphatic sulfonation occurs preferentially at the benzylic position of the side chain of the phenylpropane units. Lignosulfonates are available in the form of calcium or sodium salts (Borasperse® and Ultrazine® from Mead Westvaco, for examples) and are cheaper alternatives to other forms of lignosulfonates. Lignotech's calcium salt of lignosulfonic acid [Borresperse-CA] is especially suitable for the synthesis of metal-carbon nanocomposites. Some of the applications of lignosulfonates are in concrete admixtures, animal feed, oil-well drilling muds, dust control, emulsion stabilizers, dye dispersants, wood preservation, and mining aids. Almost a million metric tones of lignosulfonate is produced every year and the major manufacturers and their annual production is published.

Mead Westvaco and LignoTech USA are two of the major manufacturers of lignosulfonates in the U.S. and a variety of sulfonated lignin products are available from them. The sulfonation can be controlled to occur either at the aromatic ring or the benzylic position or both. The degree and position of sulfonation can affect the final property and potential application of the lignin.

Example 2

Tannin and Sources.

Figure 2:
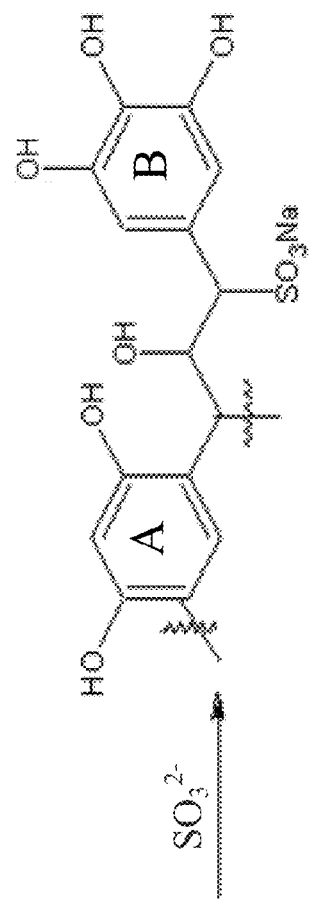
FIG. 2 shows a reaction scheme for the sulfonation of a monomeric unit of a condensed tannin according to various embodiments of the present invention.
Figure 2:
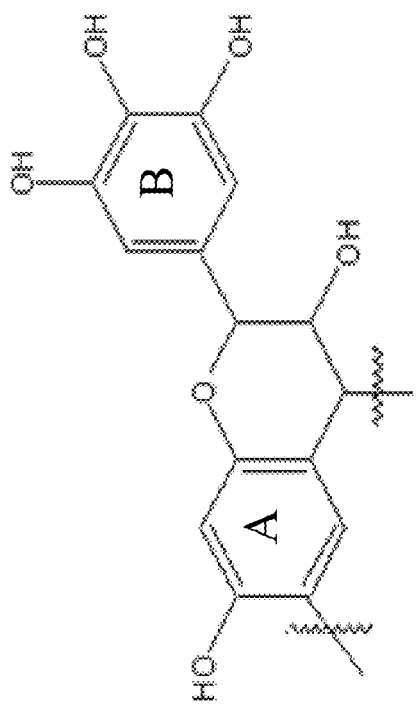

Tannins are naturally occurring polyphenols that are found in the vascular tissue of plants such as the leaves, bark, grasses, and flowers. They are classified into two groups: condensed tannins and hydrolysable tannins FIG. 2 illustrates the reaction scheme for the sulfonation of monomeric unit of a condensed tannin. The structure consists of three rings: two benzene rings on either side of an oxygen-containing heterocyclic ring. The A-ring to the left of the cyclic ether ring consists of one or two hydroxyl groups. The B-ring present on the right of the cyclic ether ring also consists of two or three hydroxyl groups.

A particular tannin of interest is Quebracho tannin. This tannin is obtained from the hot water extraction of the heartwoods of Schinopsis balansae and lorentzii, indigenous to Argentina and Paraguay. Quebracho accounts for 30% of the dry weight of the heartwoods with a production level averaging 177,000 tons per year over the past 30 years, according to the Tannin Corporation, Peabody, Mass. Sulfonated tannins are commercially available and represent an inexpensive renewable resource. For example, Chevron Philips Company in Bartlesville, Okla. supplies tannins with different degrees of sulfonation. The MSDSs and technical data sheets providing the structure and percentage of sulfur in the products are also provided. Sold under the trade name of "Orform" tannins, these represent an alternate source of a sulfonated renewable resource that could be compared to sulfonated lignins.

Example 3

Synthesis of Carbon Nanostructures and Carbon-Metal Nanocomposites.

In a typical preparation of carbon particles from lignin, tannin, lignosulfonate or tanninsulfonate or mixtures thereof according to one embodiment of the present invention, a one gram sample of the wood byproduct is treated with four drops of 85% phosphoric acid and mixed thoroughly using a mortar and pestle. It is then placed in a test tube and placed vertically inside a beaker inside a microwave-oven under the hood. The oven is then turned on for a duration of 4 minutes. The sample sparks and then turns red, glowing during the entire process. The sample may then be optionally heated further or the reaction may be terminated. The black sample is then powdered using a mortar and pestle and then introduced in an Erlenmeyer flask. A 100 mL aliquot of deionized (DI) water is brought to boil while stirring. The solution is then cooled to room temperature and filtered through a coarse filter paper. Residue is washed with 4×100 mL of DI water and then dried on the filter paper via suction. It is then dried further in a vacuum oven at room temperature overnight.

In a typical preparation of carbon-metal nanocomposites according to one embodiment of the present invention, the lignosulfonate sodium salt is converted to the desired metal lignosulfonate salt prior to carbonization.

A 10 g sample of calcium lignosulfonate according to one embodiment of the present invention, which has 5% $Ca^{2+}$ (0.0125 mol Ca ions) is added to 70 mL of DI water and heated to 90 degrees C. with stirring. A 0.0125 mol sample of metal sulfate (cobalt, nickel, iron, etc.) is then added to the solution and the reaction mixture heated for one hour at 90 degrees C. The solution is then cooled and filtered through a coarse filter paper and the filtrate is then heated at 85 degrees C. until the water evaporates. It is then furthered dried in a vacuum oven overnight at room temperature. Typical yield is around 85-90%. (Instead of the calcium salt, sodium salts in presence of metal salts may be used a starting materials for the preparation of carbon-metal nanocomposites.)

In case of metal lignosulfonates according to one embodiment of the present invention, a 1 g sample is treated with 4 drops of 85% phosphoric acid and thoroughly mixed using a mortar and pestle. It is then subjected to microwave radiation using a 650 Watt microwave oven placed under a hood for 2 minutes. It is then subjected to further 4 minutes of microwave treatment. The sample is cooled and introduced into a mortar and pestle and powdered. The sample is treated in boiling water for 10 minutes and cooled and filtered through suction. It is then washed with 4×100 mL of DI water and dried on the filter paper under suction. It is further dried in a vacuum oven in room temperature overnight.

In another method according to one embodiment of the present invention alkali is added to convert the metal lignosulfonate to a metal oxide which becomes an excellent microwave absorber. The heat generated is sufficient to carbonize the lignin and to make metal in the zero valent state by reaction with carbon.

Example 4

Characterization of Nanomaterials.

The materials synthesized according to various embodiments of the present invention were characterized by Raman and SEM techniques.

Figure 3:
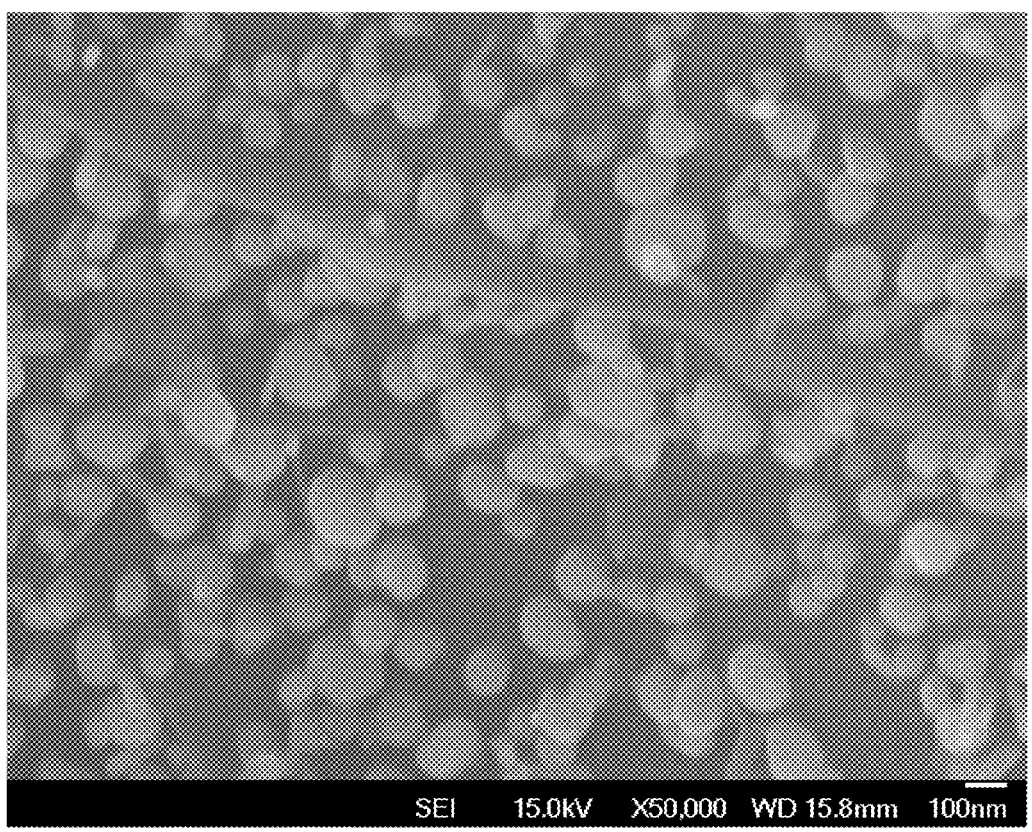
FIG. 3 shows an SEM image of nickel nanoparticles embedded in a carbon matrix prepared from nickel lignosulfonate using the microwave technique according to one embodiments of the present invention.

As shown in FIG. 3, a Scanning Electron Microscope (SEM) image shows Nickel nanoparticles embedded in a carbon matrix, which are prepared from Nickel lignosulfonate using the microwave technique according to one embodiment of the present invention.

Figure 4:
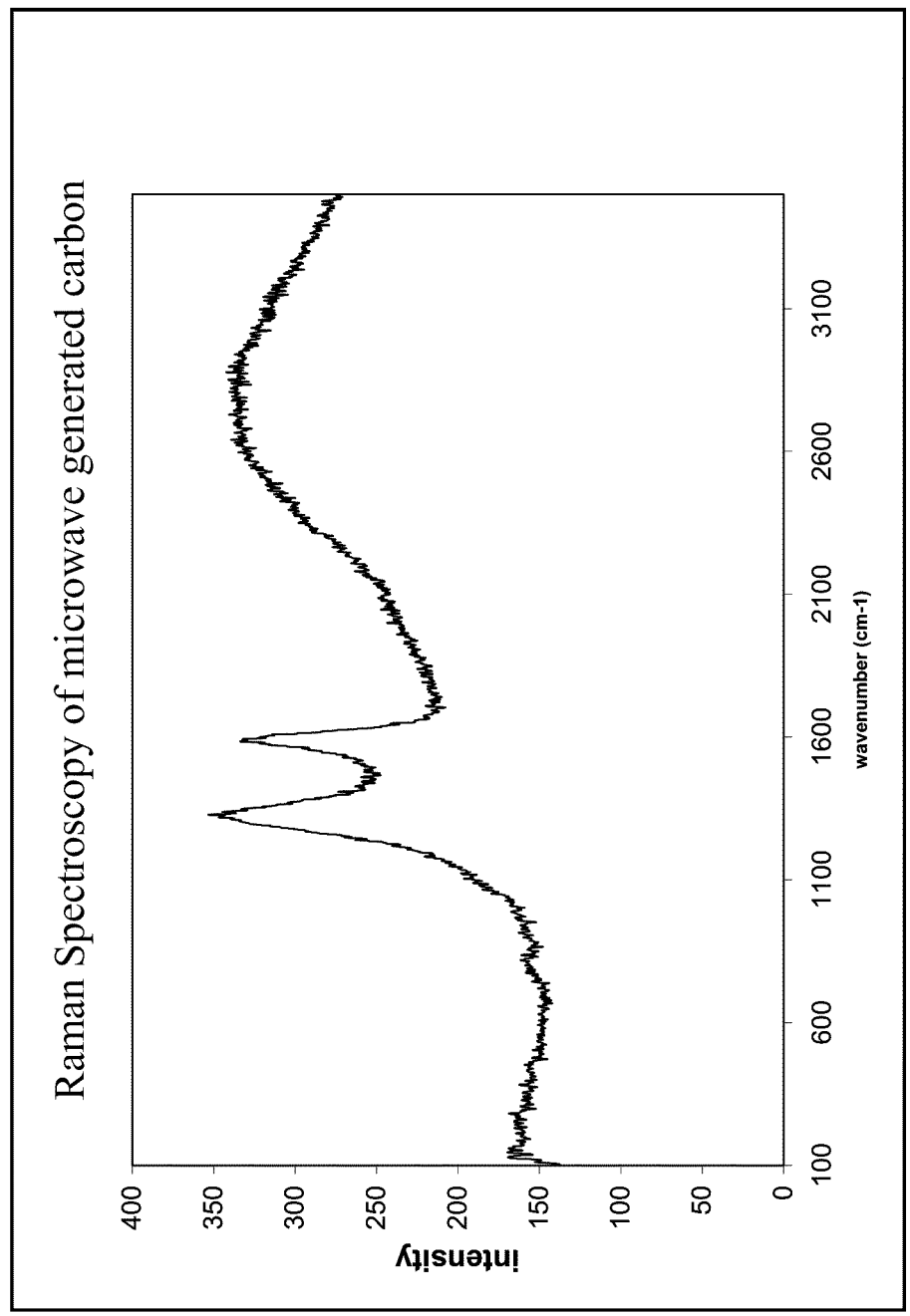
FIG. 4 shows a Raman spectroscopy of a microwave generated carbon according to one embodiments of the present invention.

A typical Raman spectroscopic data of a microwave generated carbon that is made according to one embodiment of the present invention is plotted in FIG. 4. In Raman spectroscopy as shown in FIG. 4, the peak at 1580 $cm^{-1}$ that represents the G-band (graphite) represents the $E_{2g}$ mode (stretching mode) related to the $sp^2$ carbons. The diffuse band (D-band) that occurs around 1360 $cm^{-1}$ represents the $A_{1g}$ mode (breathing mode), and is associated with C atoms in a disordered or glassy state. The measure of $I_G/I_D$ intensity ratio is generally used as a measure of graphite ordering. The broad peak that shows a maximum around 2700 $cm^{-1}$ is ascribed to the first overtone of the D band.

Example 5

Synthesis of Carbon-Iron Composite.

Another preparation of carbon particles from iron lignosulfonate using graphite to initiate the microwave assisted carbonization was carried out in a synthesis process similar to that of EXAMPLE 3 according to one embodiment of the present invention. The material obtained from the process was found to be magnetic as demonstrated by its attraction to an ordinary bar magnet, which is a collection of magnetic carbon-iron nanocomposites.

Example 6

Use of Magnetic Carbon-Iron Nanocomposites for Oil Spill Clean Up and Recovery.

A 0.3 gram sample of magnetic carbon-iron nanocomposites made according to an examplary process of EXAMPLE 5 was added to a liquid mixture in a container containing 50 mL of water and 1 mL of toluene, and then gently mixed with a glass rod. The sample of magnetic carbon-iron nanocomposites adhered to the toluene, which then was removed using a strong magnet from the water. Only traces of toluene could be seen left in the water. The water having traces of toluene can be treated again with another sample of magnetic carbon-iron nanocomposites in the same container or another container, which would further clean the water. Additional one or more similar treatments can be performed till the quality of water reaches a desired level. The removed toluene could be recovered from the magnetic carbon-iron nanocomposites adhered to the toluene after the magnetic force is removed.

Example 7

Use of Magnetic Carbon-Iron Nanocomposites for Oil Spill Clean Up and Recovery.

In another practice of the present invention, a 0.3 gram sample of magnetic carbon-iron nanocomposites made according to an exemplary process of EXAMPLE 5 was added to a liquid mixture in a container containing 50 mL of water and 1 mL of mineral oil, and then gently mixed with a glass rod. The sample of magnetic carbon-iron nanocomposites adhered to the mineral oil, which then was removed using a strong magnet from the water. Only traces of mineral oil could be seen left in the water. The water having traces of mineral oil can be treated again with another sample of magnetic carbon-iron nanocomposites in the same container or another container, which would further clean the water. Additional one or more similar treatments can be performed till the quality of water reaches a desired level. The removed mineral oil could be recovered from the magnetic carbon-iron nanocomposites adhered to the mineral oil after the magnetic force is removed.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of separating a liquid hydrocarbon material from a body of water, comprising the steps of:
   (a) mixing predetermined amount of pre-prepared magnetic carbon-metal nanocomposites with a liquid hydrocarbon material dispersed in a body of water to allow the pre-prepared magnetic carbon-metal nanocomposites each to be adhered by an amount of the liquid hydrocarbon material to form a mixture;
   (b) applying a magnetic force to the mixture to attract the magnetic carbon-metal nanocomposites each adhered by an amount of the liquid hydrocarbon material; and
   (c) removing said magnetic carbon-metal nanocomposites each adhered by an amount of the liquid hydrocarbon material from said body of water while maintaining the applied magnetic force,
      wherein the magnetic carbon-metal nanocomposites each include metal nanoparticles embedded in a carbon matrix; and
      wherein a substantial amount of carbon in the predetermined amount of pre-prepared magnetic carbon-metal nanocomposites has a first peak at 1587 $cm^{-1}$ and a second peak at 1330 $cm^{-1}$ or a first peak at 1590 $cm^{-1}$ and a second peak at 1330 $cm^{-1}$ in Raman spectroscopy.

2. The method of claim 1, further comprising repeating the steps (a)-(c) to said body of water.

3. The method of claim 1, wherein the predetermined amount of pre-prepared magnetic carbon-metal nanocomposites are formed by subjecting a first metal lignosulfonate to microwave radiation.

4. The method of claim 3, wherein the microwave radiation has a frequency in the range of 900 MHz to 5.8 GHz.

5. The method of claim 3, wherein the first metal lignosulfonate is formed by mixing a second metal lignosulfonate and a metal salt and then heating the mixture.

6. The method of claim 5, wherein the metal salt comprises iron.

7. The method of claim 3, wherein the first metal lignosulfonate is formed by mixing a lignin or a lignin derivative with a metal salt and then heating the mixture.

8. The method of claim 3, wherein the first metal lignosulfonate is alkali treated before subjecting the first metal lignosulfonate to microwave radiation.

9. The method of claim 3, wherein a microwave absorbing material is added to the first metal lignosulfonate before subjecting the first metal lignosulfonate to microwave radiation.

10. The method of claim 9, wherein the microwave absorbing material comprises graphite.

11. The method of claim 1, wherein the carbon-metal nanocomposites include iron nanoparticles in elemental state.

12. A method of separating a liquid hydrocarbon material dispersed in a volume of water, comprising the steps of:
    (a) mixing a predetermined amount of pre-prepared magnetic carbon-metal nanocomposites with a liquid hydrocarbon material dispersed in a volume of water to allow the pre-prepared magnetic carbon-metal nanocomposites each to be adhered by an amount of the liquid hydrocarbon material to form a mixture;
    (b) applying a magnetic force to the mixture to attract the magnetic carbon-metal nanocomposites each adhered by an amount of the liquid hydrocarbon material;
    (c) removing said magnetic carbon-metal nanocomposites each adhered by an amount of the liquid hydrocarbon material from said volume of water while maintaining the applied magnetic force;
    (d) removing the magnetic force; and
    (e) separating the liquid hydrocarbon material from the said magnetic carbon-metal nanocomposites,
       wherein the pre-prepared magnetic carbon-metal nanocomposites each include metal nanoparticles embedded in a carbon matrix; and
       wherein a substantial amount of carbon in the predetermined amount of pre-prepared magnetic carbon-metal nanocomposites has a first peak at 1587 $cm^{-1}$ and a second peak at 1330 $cm^{-1}$ or a first peak at 1590 $cm^{-1}$ and a second peak at 1330 $cm^{-1}$ in Raman spectroscopy.

13. The method of claim 12, wherein the predetermined amount of pre-prepared magnetic carbon-metal nanocomposites are formed by subjecting a first metal lignosulfonate to microwave radiation.

14. The method of claim 13, wherein the microwave radiation has a frequency in the range of 900 MHz to 5.8 GHz.

15. The method of claim 13, wherein the first metal lignosulfonate is formed by mixing a second metal lignosulfonate and a metal salt and then heating the mixture.

16. The method of claim 15, wherein the first metal lignosulfonate is formed by mixing a lignin or a lignin derivative with a metal salt and then heating the mixture.

17. The method of claim 16, wherein the metal salt comprises iron.

18. The method of claim 13, wherein the first metal lignosulfonate is treated with alkali before subjecting the first metal lignosulfonate to microwave radiation.

19. The method of claim 13, wherein a microwave absorbing material is added to the first metal lignosulfonate before subjecting the first metal lignosulfonate to microwave radiation.

20. The method of claim 19, wherein the microwave absorbing material comprises graphite.

21. The method of claim 12, wherein the carbon-metal nanocomposite includes iron nanoparticles in elemental state.

* * * * *